United States Patent [19]

Lake, Jr.

[11] Patent Number: 4,880,191

[45] Date of Patent: Nov. 14, 1989

[54] MOUNTING ARRANGEMENT FOR DISPLAY TERMINAL

[75] Inventor: Ralph J. Lake, Jr., Somerville, N.J.

[73] Assignee: Unisys Corporation, Blue Bell, Pa.

[21] Appl. No.: 814,536

[22] Filed: Dec. 20, 1985

Related U.S. Application Data

[63] Continuation of Ser. No. 627,855, Jul. 5, 1984, abandoned.

[51] Int. Cl.⁴ ............................................. A40G 29/00
[52] U.S. Cl. .................................. 248/371; 248/221.4; 248/923

[58] Field of Search ...................... 248/316.7, 1 F–1 I, 248/221.4, 144, 222.1, 371; 312/251, 256, 7.2; 403/406, 407, 408, 116, 117, 61, 98

[56] References Cited

U.S. PATENT DOCUMENTS

| | | | |
|---|---|---|---|
| 2,520,725 | 8/1950 | Judd | 403/406 |
| 3,699,580 | 10/1972 | Joseph et al. | 403/405 |
| 3,908,942 | 9/1975 | Keith et al. | 248/1 F |
| 4,068,961 | 1/1978 | Ebner et al. | 248/181 |
| 4,415,136 | 11/1983 | Knoll | 248/1 F |

*Primary Examiner*—Joseph Falk
*Attorney, Agent, or Firm*—Mark T. Starr

[57] ABSTRACT

A data display terminal comprising a cabinet having a base which is provided with an array of apertures to which a tilt-swivel assembly can be detachably secured.

12 Claims, 2 Drawing Sheets

MOUNTING ARRANGEMENT FOR DISPLAY TERMINAL

This is a continuation of co-pending application Ser. No. 627,855 filed on 7/5/84, now abandoned.

BACKGROUND OF THE INVENTION

Data display terminals include a cabinet which contains a cathode ray tube (CRT) and various circuit modules which process electrical signals for display on the CRT. At the present time, one form of cabinet includes in its bottom surface a spherical section which is seated on a support base having a concave depression in which the spherical section is seated for supporting the terminal. This arrangement permits the terminal cabinet to be tilted and swiveled by the user. However, the support base is an expensive extra part, and the cabinet having the integral spherical projection must always be used with the extra base. If the user wanted to set the cabinet directly on a desk or table, he could not.

The present invention provides a terminal cabinet having an optional removable spherical support.

DESCRIPTION OF THE INVENTION

A data display terminal 10 embodying the invention includes a cabinet 20 containing a cathode ray tube, hardware, and various circuit boards (not shown).

Figure 1:
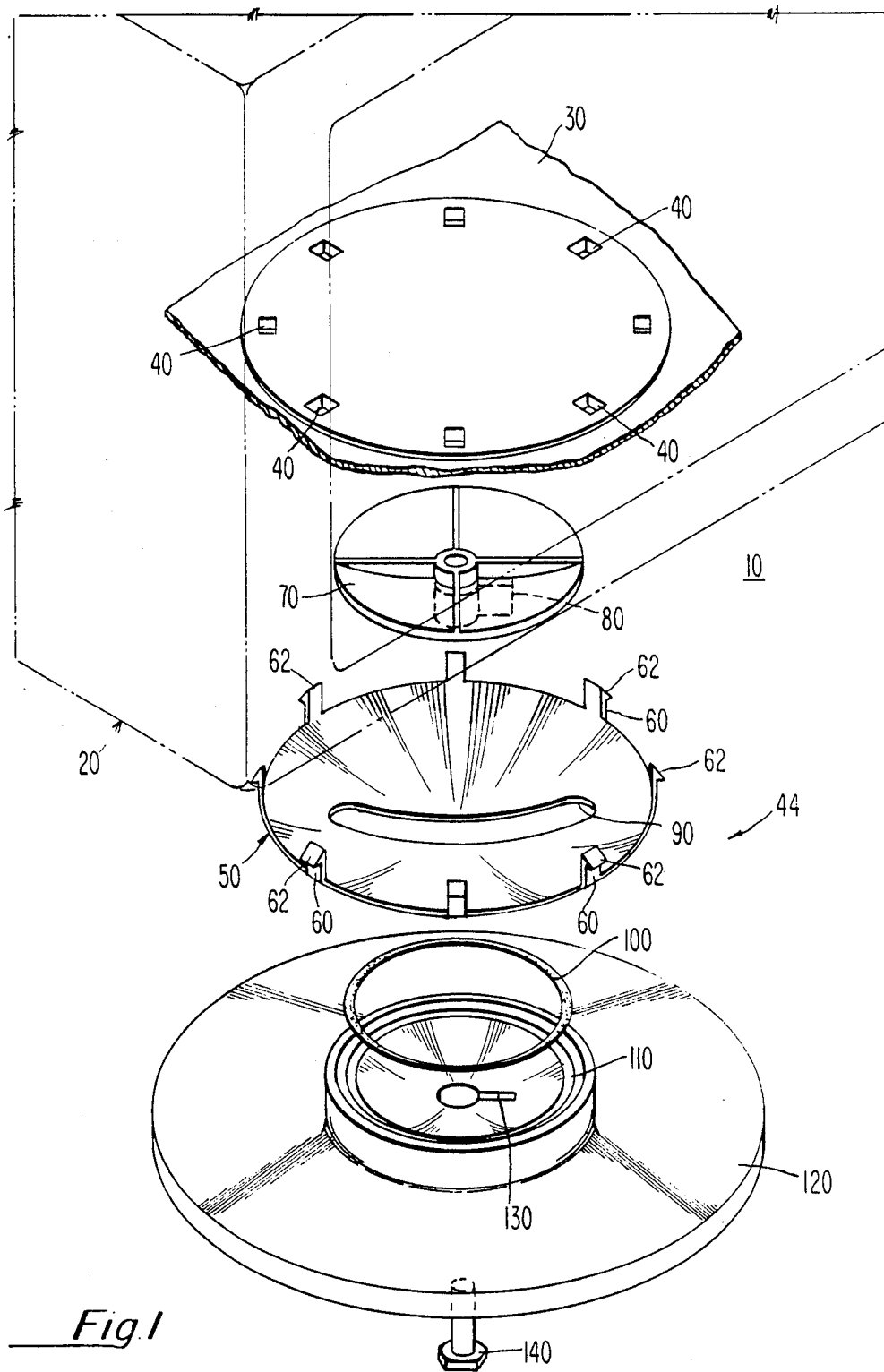
FIG. 1 is a perspective exploded view of the invention.
Figure 2:
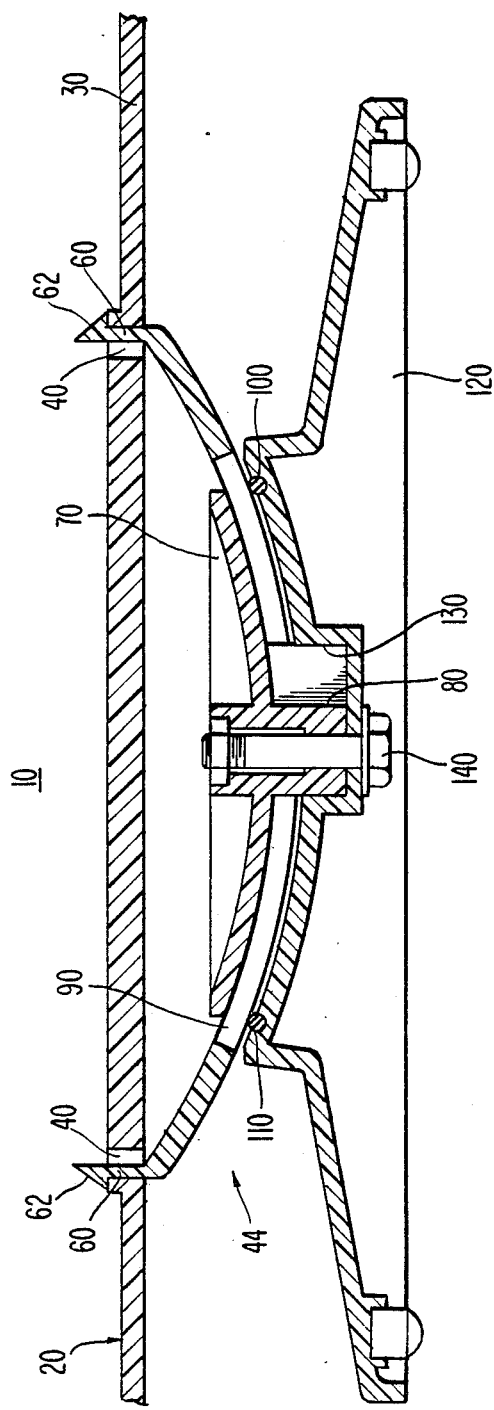
FIG. 2 is a sectional view of a portion of the invention.

According to the invention, the base 30 of the cabinet is provided with a circular array of apertures 40, each of which is shown as being rectangular, but other shapes can be used. According to the invention, an optional tilt-swivel assembly 44 is provided which includes a truncated ball or spherical section 50 having a circumference along which are provided a plurality of slightly flexible tabs 60, preferably identical in number to the number of apertures 40 in the base 30 of the cabinet 20, so that the truncated ball can be snapped into tight engagement with the base of the cabinet by inserting the tabs 60 into the apertures 40. Each tab 60 includes at its upper end a lip 62 which can engage the edge of the cabinet base which defines an aperture 40, as seen in FIG. 2.

A disk 70 is seated on the top surface of the ball 50, and the disk has a projecting key 80 which projects downwardly from its lower surface and is seated in a slot 90 in the ball. The disk 70 is thus arranged to move back and forth only along the slot 90. The ball 50 is seated on an O-ring 100 which is seated in a concave depression 110 in a pedestal 120. The key 80 of disk 70 enters the keyway 130 in the depression 110 in the pedestal 120, and a screw 140 is secured to the disk 70 to secure all of the parts together.

In operation of the invention, if it is desired to set the terminal cabinet directly on a table with no provision for tilting or swiveling, then the tilt-swivel assembly 44 is not secured to the cabinet. On the other hand, if the ability to tilt and swivel is desired, then the assembly 44 is coupled to the cabinet by inserting the tabs 60 on the ball 50 into the holes 40 in the base of the cabinet where they are locked in place. The cabinet swivels due to the ball 50 riding on O-rings 100, and it tilts by means of key 80 guided in slot 90 in ball 50; that is, the ball 50 moves with respect to the key.

What is claimed is:

1. A display terminal comprising:
   a cabinet having a base, a plurality of apertures in said base; and
   means for supporting said cabinet, said support means including a plurality of flexible tabs which are engageable with said plurality of apertures to couple said cabinet to said support means, said support means further including
   pedestal means for supporting said display terminal on a planar surface, said pedestal means including a swivel bottom having a first recess therein, said first recess having a surface of curvature defined by a first radius,
   a swivel top having a second recess therein, said second recess having a surface of curvature defined by a second radius, said swivel top including said plurality of flexible tabs, a first end of each of said flexible tabs connected to said swivel top, the distal end of each of said flexible tabs projecting upward from said swivel top,
   a curved slot provided adjacent the surface of curvature of said second recess, a keyway provided adjacent the surface of curvature of said first recess,
   a disk, said disk including a key projecting downward from its lower surface, said disk positioned in contact with said second recess with the key passing through said curved slot and seated in said keyway, and
   a bolt passing through said disk, said key, said curved slot and said keyway, a nut engaging the threaded end of said bolt, the head of said bolt having a diameter too large to pass through said keyway.

2. The display terminal in accordance with claim 1 further including an O-ring positioned between said swivel top and said swivel bottom.

3. The display terminal in accordance with claim 2 wherein a concave depression is provided in said swivel bottom, said O-ring seated in said concave depression.

4. The display terminal in accordance with claim 1 wherein the surface of curvature of said swivel bottom is the same as the surface of curvature of said swivel top and wherein said disk has a surface of curvature which is the same as that of said swivel top and said swivel bottom.

5. The display terminal in accordance with claim 1 wherein said plurality of flexible tabs includes more than two of said flexible tabs, and wherein said plurality of flexible tabs are positioned around the periphery of said second recess, each of said flexible tabs aligned with and passing through one of said apertures in said cabinet base.

6. The display terminal in accordance with claim 5 wherein each of said flexible tabs includes a leg connected to said second recess and extending upward therefrom, a head extending outwardly and at a substantially right angle from the distal end of each of said legs.

7. The display terminal in accordance with claim 5 wherein said apertures are arrayed in a generally circular pattern and said flexible tabs are arrayed in the same circular pattern.

8. The display terminal in accordance with claim 1 including means or engaging and disengaging said cabinet and said supporting means from each other.

9. The display terminal according to claim 5 wherein said key includes:

a cylindrical section having a bore;

a substantially planar projection projecting outwardly from the cylindrical surface of said cylindrical section; and wherein said keyway is formed to accommodate said cylindrical section and said planar projection.

10. The display terminal according to claim 9 wherein said disk has a hole passing through its geometric center, said bore aligned with said hole.

11. The display terminal according to claim 10 wherein said bolt passes through said bore and said hole.

12. The display terminal according to claim 11 wherein said planar projection extends along the entire length of said cylindrical section.

* * * * *